(12) United States Patent
Kuo (10) Patent No.: US 7,281,255 B2
(45) Date of Patent: Oct. 9, 2007

(54) DISC GUIDING MECHANISM

(75) Inventor: Tsung Jung Kuo, Hsinchu (TW)

(73) Assignee: Lite-On It Corporation (TW)

( * ) Notice: Subject to any disclaimer, the term of this patent is extended or adjusted under 35 U.S.C. 154(b) by 422 days.

(21) Appl. No.: 10/992,845

(22) Filed: Nov. 22, 2004

(65) Prior Publication Data

US 2006/0053428 A1 Mar. 9, 2006

(30) Foreign Application Priority Data

Sep. 8, 2004 (TW) .............................. 93127207 A (51) Int. Cl.
*G11B 17/04* (2006.01)
(52) U.S. Cl. ...................... 720/623; 720/616
(58) Field of Classification Search ................ 720/618, 720/619, 620, 622, 623, 616
See application file for complete search history.

(56) References Cited

U.S. PATENT DOCUMENTS

| 4,470,136 | A | * | 9/1984 | Takahashi et al. ....... 369/77.11 |
| 6,222,810 | B1 | * | 4/2001 | Kang et al. ................. 720/620 |
| 6,288,982 | B1 | * | 9/2001 | Kato ....................... 369/30.36 |
| 6,941,564 | B2 | * | 9/2005 | Shimozaki ................... 720/620 |
| 2001/0053116 | A1 | * | 12/2001 | Sato ........................... 369/77.1 |
| 2003/0165104 | A1 | * | 9/2003 | Shimozaki ................. 369/77.1 |

FOREIGN PATENT DOCUMENTS

| JP | 57088568 A | * | 6/1982 |
| JP | 2002269883 A | * | 9/2002 |
| JP | 2004071019 A | * | 3/2004 |

\* cited by examiner

*Primary Examiner*—William J. Klimowicz
(74) *Attorney, Agent, or Firm*—Bacon & Thomas PLLC (57) ABSTRACT

The present invention relates to a disc guiding mechanism, having: a main body which provided with a teeth array at one side; a first sliding bar and a second sliding bar both of which are provided on the main body; a transmission element provided on the main body and engaged with both of the sliding bars; a first hook and a second hook rotatably provided on each sliding bar respectively; and a first elastic member and a second elastic member provided on each sliding bar to provide an elasticity on the hooks. According to the disc guiding mechanism of the present invention, a disc is guided by the hooks and carried into an optical disc device, the transmission element restricts the first and the second sliding bars to slide symmetrically, so that the disc is guided and carried in a correct direction. Accordingly, a disc jamming in the optical disc device resulted from loading in an incorrect direction is avoided.

14 Claims, 13 Drawing Sheets

DISC GUIDING MECHANISM

This Non-provisional application claims priority under 35 U.S.C. §119(a) on Patent Application No(s). 093127207 filed in Taiwan, Republic of China on Sep. 8, 2004, the entire contents of which are thereby incorporated by reference.

FIELD OF THE INVENTION

The present invention relates to a disc guiding mechanism, particularly to a disc guiding mechanism provided at the inlet of a slot-in loading optical disc device.

BACKGROUND OF THE INVENTION

With the technology development, magnetic storage medium is not satisfactory to current people to transfer, store, and read a large amount of information due to its small storage capacity. Thus an optical disc having a large storage capability has been developed. Corresponding to the development of the optical disc, a variety of optical disc devices have been developed for reading such an optical disc.

According to the disc loading type, the optical disc device can be classified as slot-in loading, cover-lifting, single-tray, and multi-tray types. Among them, for the slot-in loading type optical disc device, it uses a roll provided in the device to roll the disc into the device and then uses a disc positioning mechanism to guide the disc in a position for reading.

However, with developing of optical discs, discs not only having various sizes such as 8 cm or 12 cm, but also having various shapes, for example, non-circular disc such as oval, heart shapes, and so on have been developed.

In the traditional slot-in loading type optical disc device, there is a disc positioning mechanism for positioning the disc in a correct reading position. The disc positioning mechanism just can position discs in a form of circular. Thus, when such non-circular discs are loaded in the slot-in loading type optical disc device, it is easily jammed in the device due to its non-normalized shape and size. It may cause the damage to the mechanism in the optical disc devise. Moreover, even though the disc to be loaded is in a normalized shape, it also has a possibility of disc jamming due to in-correct loading direction. If the user loads the disc in an in-correct loading direction, for example, that the loading direction is deviated from the center of the inlet for sucking the disc in, the disc positioning mechanism in the optical disc device may fail to position the disc in the correct reading position. It may cause the disc being jammed in the device, and the mechanism in the device will be damaged.

Under this circumstance, the present inventor has conducted an investigation on the disc-loading mechanism and thus completed this invention.

SUMMARY OF THE INVENTION

The main object of the present invention is to provide a disc guiding mechanism at the inlet of a slot-in loading optical disc device, which mainly comprises: a main body provided with a teeth array at its one side; a first and a second sliding bars both of which are provided on the main body; a transmission element provided on the main body and engaged with both of the sliding bars; a first and a second hooks engaged with the teeth array and rotatably provided on each sliding bar, respectively; and a first and a second elastic members provided on each sliding bar for providing a rebounding force to the hooks; wherein the hooks are each provided with hooking parts to be engaged with the teeth array and each provided with guiding parts to guide the disc into the device and allow the hooking part being disengaged from the teeth array.

According to the disc guiding mechanism of the present invention, when a disc is to be loaded in a slit-in loading optical disc device, the periphery of the disc first touch the guiding parts provided on the hooks and the hooks are then pressed by the disc and disengaged from the teeth array during loading of the disc. Thereafter, the first and the second sliding bars slide in opposite directions symmetrically and thus the disc is loading into the device in a correct direction.

According to the disc guiding mechanism of the present invention, the first and the second hooks are engaged with and restricted by the teeth array provided on the main body if no disc is loaded. If the hooks are not pressed by the disc symmetrically and simultaneously, the hooks could not be disengaged from the teeth array and the sliding bars thus could not slide apart from each other. Therefore, user can load the disc into the devices in a correct direction according to the disc guiding mechanism of the present invention.

According to the disc guiding mechanism of the present invention, if the disc is loaded into the optical disc device in an incorrect direction, one or both hooks could not be disengaged from the teeth so that the disc would be retarded at the inlet of the device before loading into the device. Thus user could re-load the disc in a correct direction or give up to load the unsuitable disc. Therefore the disc would not be jammed in the device which causes the damage to the device.

According to the disc guiding mechanism of the present invention, since the first and the second sliding bars slide in a manner of apart from or closing to each other, it is suitable to various size disc to be loaded as long as the diameter of disc is equal or less than the maximum extending distance of the sliding bars.

According to the disc guiding mechanism of the present invention, the first and the second sliding bars are sliding in a manner of apart from or closing to each other via a transmission element. The transmission element could be a gear and the sliding bars are correspondingly provided with a rack to be engaged therewith. Alternatively, the transmission element could be an endless teeth track and the sliding bars are correspondingly provided with an array of teeth to be engaged therewith.

According to the transmission element engaged with both of the first and the second sliding bars, if one of the hooks is not disengaged from the teeth array, both of the first and the second sliding bars would not slide. So that the circular disc is restricted to be loaded in a correct position, e.g. in the center of the inlet, and the non-circular disc can not be loaded into the device. It avoids the disc jammed in the device which causes the damage to the device.

According to the disc guiding mechanism of the present invention, it can load the circular disc in the correct direction and avoid the non-circular disc being loaded into the optical disc device. And it decreases the opportunity of the damage to the device caused by the disc jammed in the device.

BRIEF DESCRIPTION OF THE DRAWINGS

The present invention is illustrated more detail by reference to the accompanying drawings, wherein.

DETAILED DESCRIPTION OF THE INVENTION

The present invention is now further illustrated by the following examples, in which the main body in the disc guiding mechanism of the present invention is a cover plate of the housing for accommodating the disc in the optical disc device, the first and the second sliding bars are positioned in the same plane, and the transmission element is a gear.

Figure 1:
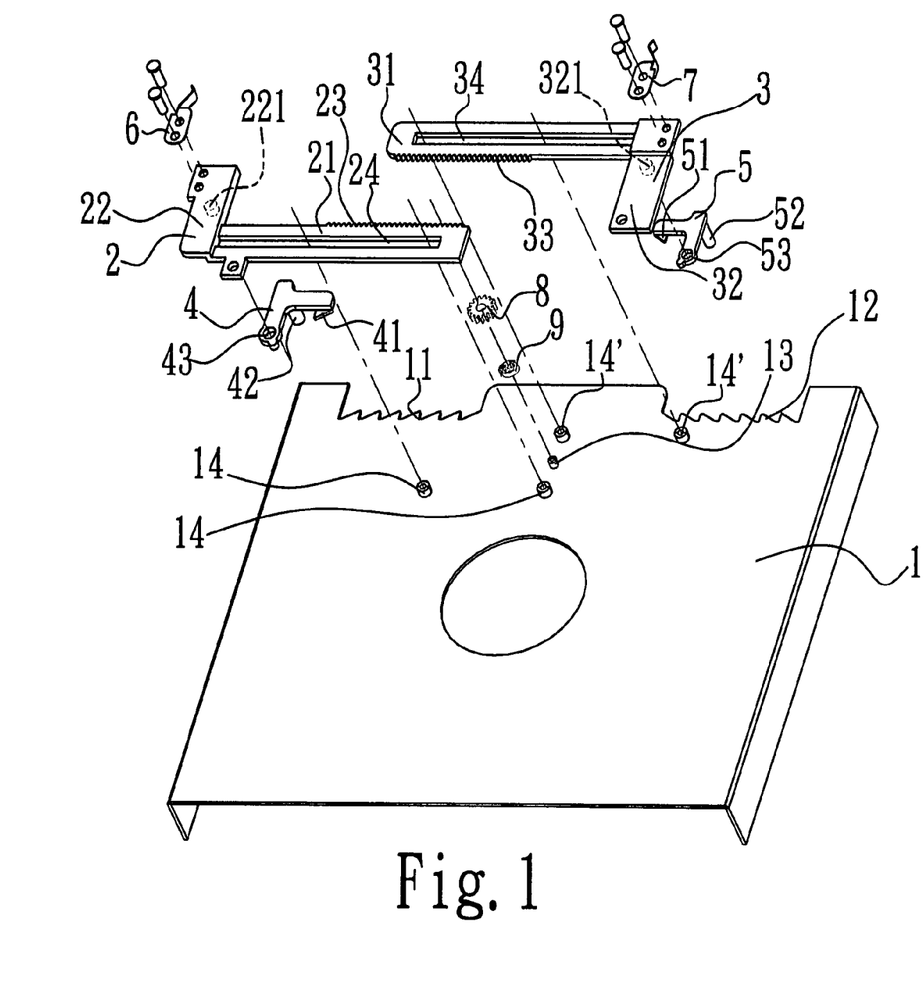
FIG. 1 is an exploding drawing showing one embodiment of the disc guiding mechanism of the present invention.

FIG. 1 is an exploding drawing showing one embodiment of the disc guiding mechanism of the present invention.

Please refer to FIG. 1, the disc guiding mechanism of the present invention mainly comprises a first sliding bar 2 and a second sliding bar 3 provided on a main body 1; a first hook 4 and a second hook 5; a first elastic member 6 and a second elastic member 7; and a transmission element (a gear) 8.

The main body 1 could be the top cover or the base board of the housing for accommodating the disc in the optical disc device. And the main body 1 is provided with teeth arrays 11 and 12 on the side to which the disc is to be loaded. The first hook 4 and the second hook 5 are rotatably disposed on the first sliding bar 2 and second sliding bar 3 respectively. The first hook 4 and the second hook 5 are also provided with hooking parts 41 and 51, respectively. The hooking parts 41 and 51 are engaged with the teeth arrays on the main body 1 when no disc is loading. The first hook 4 and the second hook 5 are each also provided with guiding parts 42 and 52, respectively, so that the peripheral of the disc would push the guiding parts 42 and 52 to allow the hooks 4 and 5 rotating against spinning centers 43 and 53. Then the hooking parts 41 and 51 would be disengaged from the teeth arrays 11 and 12 to allow the first sliding bar 2 and the second sliding bar 3 moving on a main body 1.

The first and the second sliding bars could be positioned in the same or different planes, as long as the both hooks for guiding the disc are positioned in the same planes. In this regard, if the first and the second sliding bars are positioned in different planes, any auxiliary member is provided to let the both hooks being positioned in the same plane.

Figure 3A:
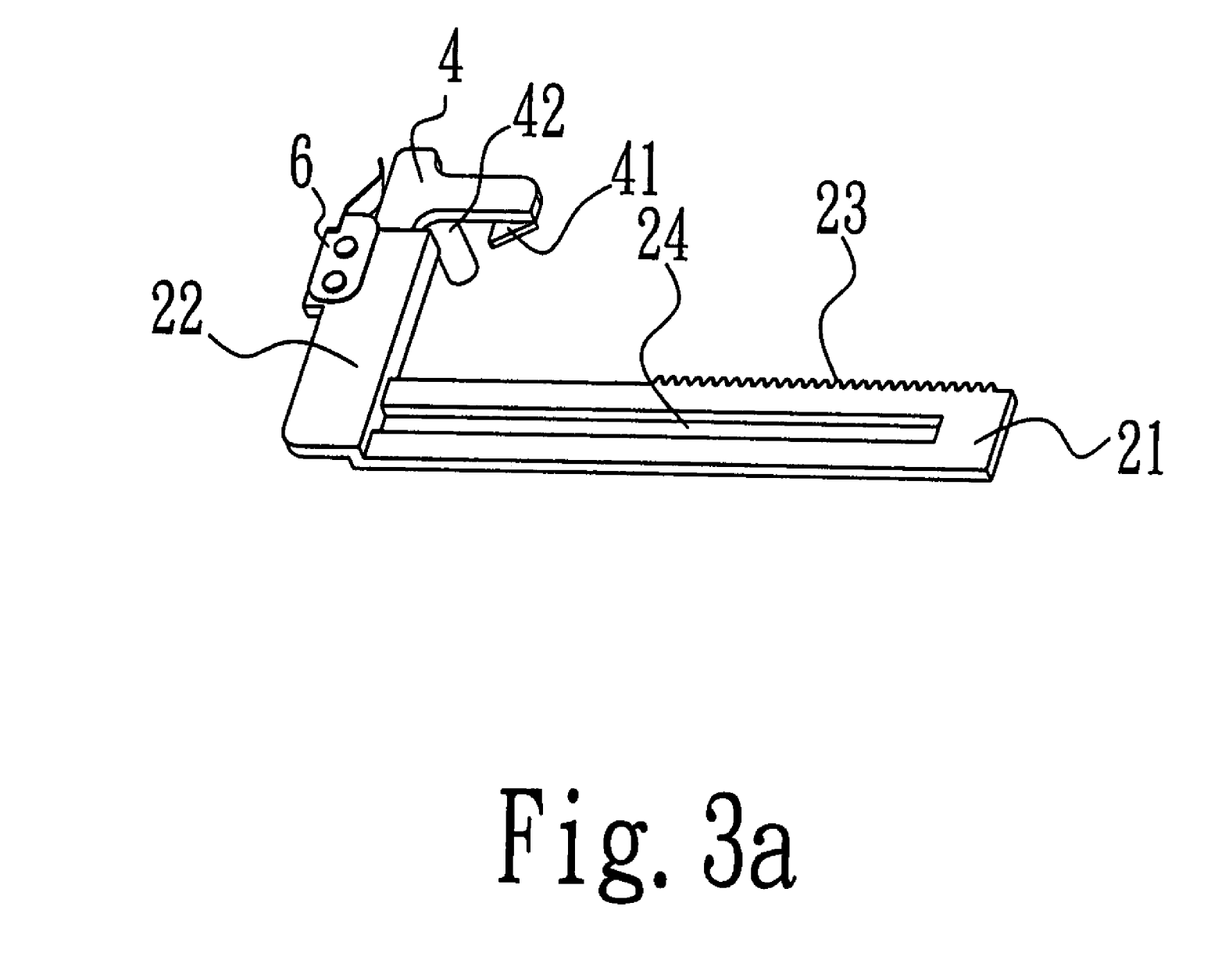
FIGS. 3a and 3b are drawings showing the assembly of the first and the second sliding bars, respectively.

The first sliding bar 2 is moveably provided on the main body 1 and further comprises a horizontal bar 21 and a vertical bar 22. The horizontal bar 21 is further provided with a sliding track 23 at its upper side to be engaged with the transmission element 8. In this embodiment, the sliding track 23 is a rack and the transmission element is a gear. Also, to allow the sliding bar could move in a desired direction, the horizontal bar 21 is further provided with a guiding groove 24, which could cooperate with a protrusion cylinder 14 provided on the main body 1 to allow the sliding bar 2 sliding in a horizontal direction. The vertical bar 22 is further provided with a pivot 221 at a position corresponding to the spinning center 43 provided on the first hook 4. Thus the spinning center 43 provided on the first hook 4 is rotatably disposed on the pivot 221 to provide the hook 4 a fulcrum for spinning against the spinning center 43. The number of the protrusion cylinder 14 provided on the main body 1 could be one or more and the shape of the protrusion 14 could be rectangular or other shapes. The assembly of the first sliding bar 2 is shown in FIG. 3a.

Figure 3B:
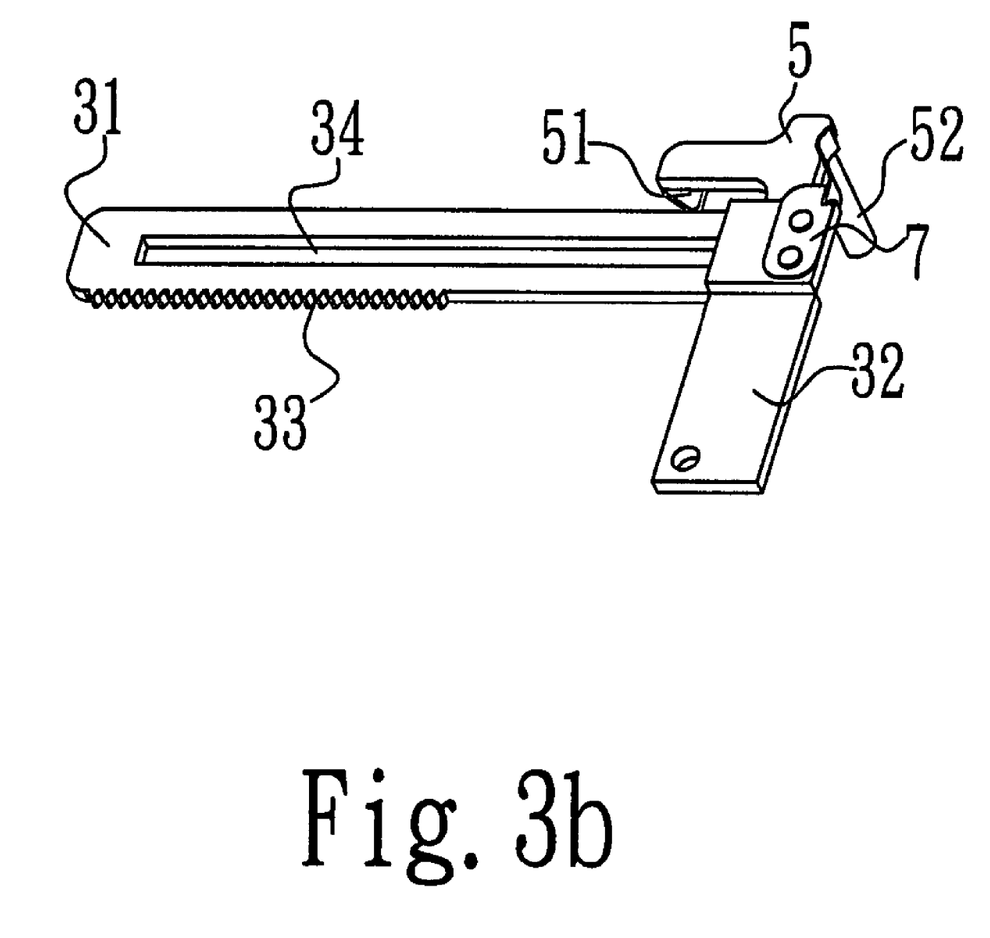

Similarly, the second sliding bar 3 is moveably provided on the main body 1 and further comprises a horizontal bar 31 and a vertical bar 32. The horizontal bar 31 is further provided with a sliding track 33 at its lower side to be engaged with the transmission element 8. In this embodiment, the sliding track 33 is a rack and the transmission element is a gear. Also, to allow the sliding bar could move in a desired direction, the horizontal bar 31 is further provided with a guiding groove 34, which could cooperate with a protrusion cylinder 14' provided on the main body 1 to allow the sliding bar 3 sliding in a horizontal direction. The vertical bar 32 is further provided with a pivot 321 at a position corresponding to the spinning center 53 provided on the second hook 5. Thus the spinning center 53 provided on the second hook 5 is rotatably disposed on the pivot 321 to provide the hook 5 a fulcrum for spinning against the spinning center 53. The number of the protrusion cylinder 14' provided on the main body 1 could be one or more and the shape of the protrusion 14' could be rectangular or other shapes. The assembly of the second sliding bar 3 is shown in FIG. 3b.

The transmission element 8 is disposed on the main body 1 via a shaft 13 as a spinning center to allow the transmission element 8 rotating. The transmission element 8 is engaged with the first sliding bar 2 and the second sliding bar 3 at the same time so that the first sliding bar 2 and the second sliding bar 3 slide in opposite directions symmetrically.

The shaft 13 is also provided with a clockwork-like spring 9 of which one end is fixed to the shaft 13 and the other end is fixed to the transmission element 8 so that the clockwork-like spring 9 is in a tension state when the first sliding bar 2 and the second sliding bar 3 are sliding with respect to each other and the transmission element 8 is rotated to allow the disc loading. After loading the disc into the device, the tension force of the clockwork-like spring 9 pulls the first and the second sliding bar 2 and 3 back to their original position.

Alternatively, the action for pulling the first and the second sliding bars 2 and 3 back to their original position for next loading could be achieved by providing an extension spring between the main body 1 and the both sliding bars 2 and 3 respectively or between the first sliding bar 2 and the second sliding bar 3.

It also could provide a driving means, which will drive the sliding bars sliding toward opposite directions respectively, after the hooks are disengaged from the teeth array and drive the sliding bars sliding back to their original position for next loading after the disc has been already loaded into the device.

The first elastic member 6 and the second elastic member 7 are each fixed to the vertical bars 22 and 23, respectively, at its one end and each contact with the first hook 4 and the second hook 5, respectively. The function of the elastic members is to provide a rebounding force to the hooks 4 and 5 to engage with the teeth arrays 11 and 12 on the main body 1 and then fix the first sliding bar 2 and the second sliding bar 3 in a position when the first hook 4 and the second hook 5 are not pressed by a disc.

Figure 4A:
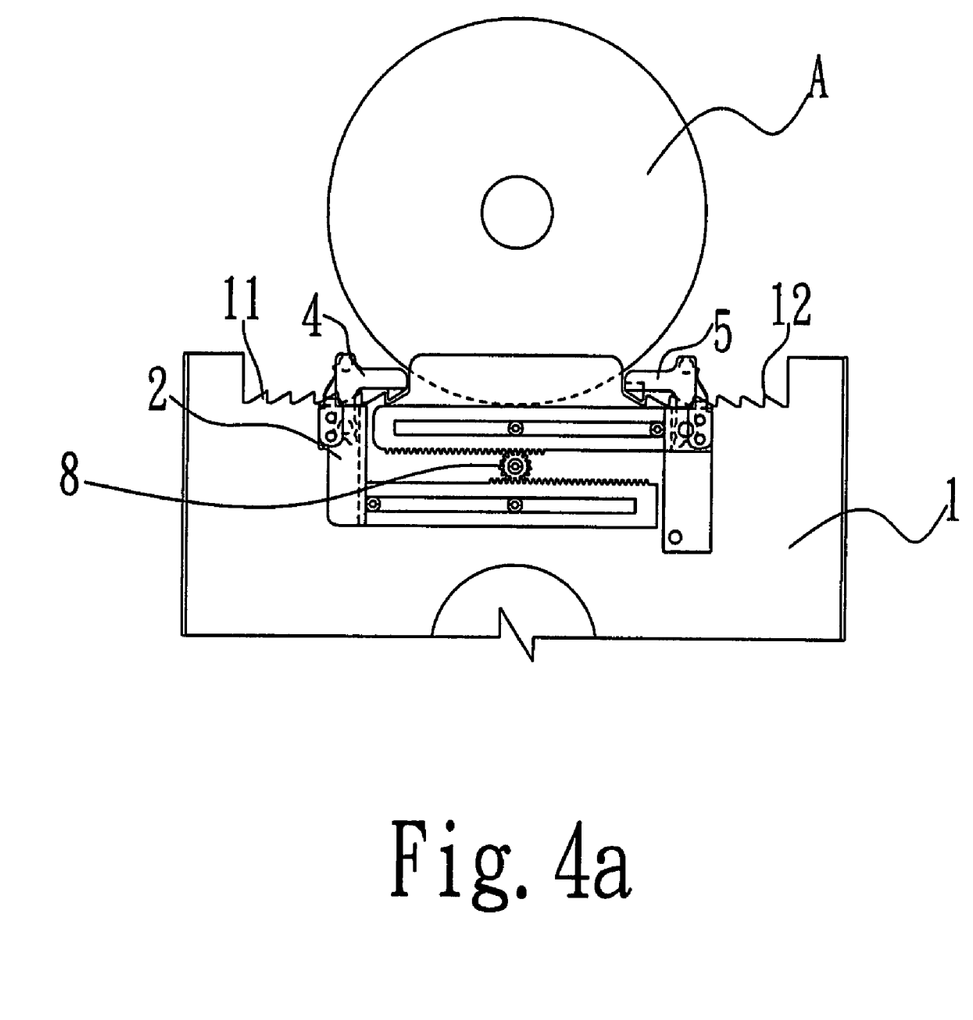
FIGS. 4a to 4d are drawings showing the continuous action during loading of a disc.
Figure 4B:
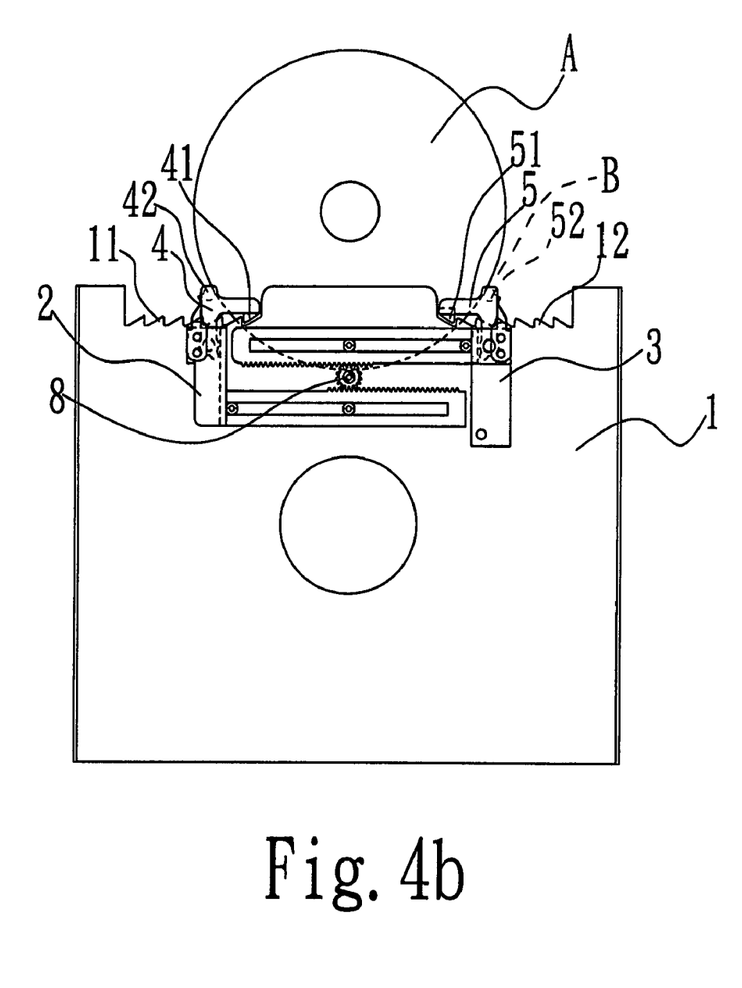
Figure 4C:
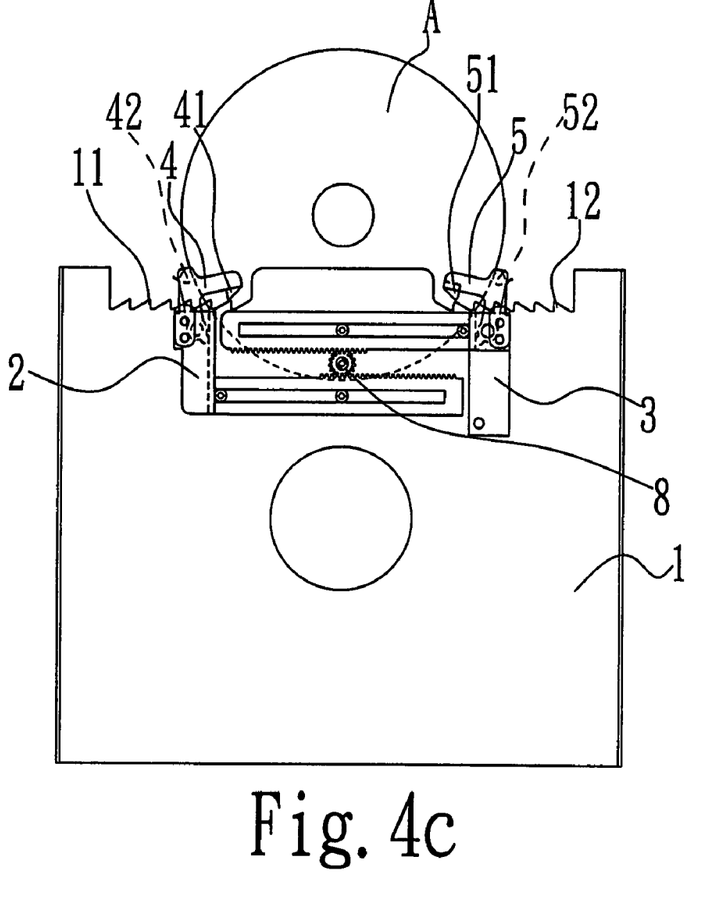
Figure 4D:
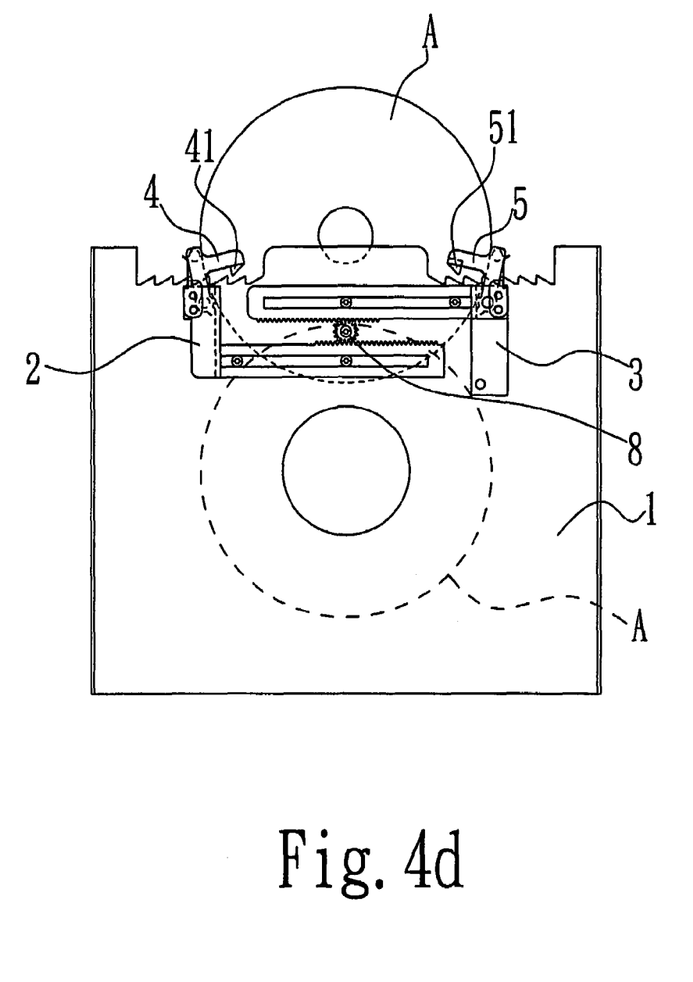

The operation of the embodiment of the disc guiding mechanism will be further illustrated by reference to FIGS. 4a to 4d which show the continuous action during loading of a disc. FIG. 4a shows that a disc A is pushed into the inlet of the optical disc device. FIG. 4b shows that part of the disc A has been loaded into the device and its periphery B contacts with guiding parts 42 and 52 of the hooks 4 and 5 in the disc guiding mechanism while the disc A has not yet pressed the hooks. FIG. 4c shows that the disc A has further been loaded into the devices and its periphery B presses against the guiding parts 42 and 52 so that the hooking parts 41 and 51 of the hooks 4 and 5 are disengaged from the teeth arrays 11 and 12 and the first sliding bar 2 and the second sliding bar 3 are moved smoothly toward right and left, respectively. FIG. 4d shows that the disc A has been loaded into the device in a correct direction as shown by a dotted line.

Along with the disc loading, the periphery B of the disc A presses against the guiding parts 42 and 52 to disengage the hooking parts 41 and 51 from the teeth arrays 11 and 12. Then the periphery B of the disc A further pushes the first sliding bar 2 and the second sliding bar 3 via the hooks 4 and 5 to slide toward right and left, respectively, so that the disc could be loaded into the device smoothly. Furthermore, via the symmetrical sliding of the first sliding bar 2 and the second sliding bar 3, the disc could be loaded into the device in the correct position. Moreover, the first elastic member 6 and the second elastic member 7 provide a rebounding force to the hooks 4 and 5 to maintain the hooks contacting with the periphery B of the disc A during loading the disc and provide a rebounding force to the hooks 4 and 5 to engage with the teeth on the main body when the disc does not press against the hooks.

Figure 5:
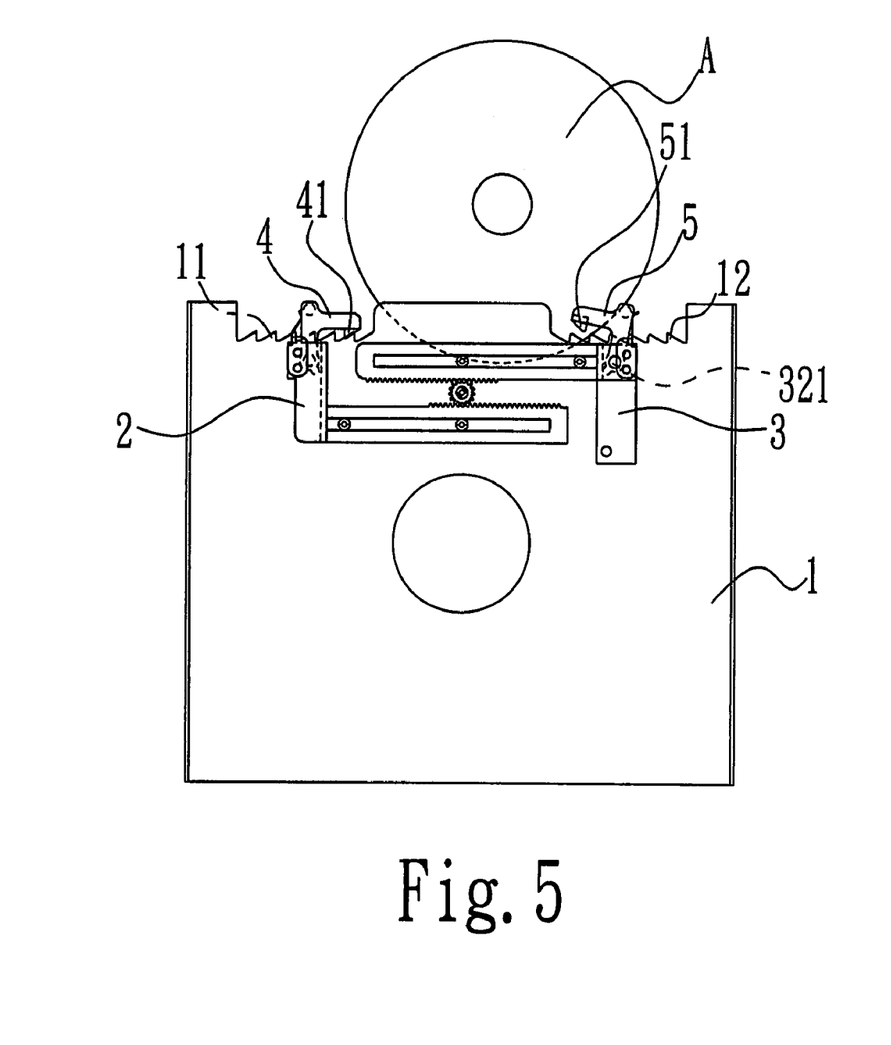
FIG. 5 is a perspective drawing showing one case that loading of disc is in an incorrect direction.

Now please refer to FIG. 5. FIG. 5 is a perspective drawing showing one case that loading of disc is in an incorrect direction. As shown in FIG. 5, the periphery B of the disc A only presses against the guiding part 52 to disengage the hook 5 from the teeth array 12 while the hook 4 is still engaged with the teeth array 11. Also, since the first and the second sliding bars 2 and 3 are sliding with respect to each other via the transmission element 8, although the second hook 5 has been disengaged from the teeth array 12, the hook 4 is still engaged with the teeth array 11 so that the second sliding bar 3 is also restricted by the transmission element 8. Consequently, the disc can not be loaded into the device.

Only in the case that the periphery B of the disc A presses against the both guiding parts 42 and 52 to disengage the both hooks from the teeth arrays simultaneously, the first sliding bar 2 and the second bar 3 can slide simultaneously via the transmission element 8 to load the disc. Therefore, the disc can be loaded into the device correctly and smoothly.

Moreover, according to the disc guiding mechanism of the present invention, by pressing against the both guiding parts simultaneously, the disc A would be loaded in a correct direction then the first and the second sliding bars 2 and 3 would slide symmetrically with respect to each other by the action of the transmission element 8 so that the disc is always loaded in the correct direction during its loading. Therefore, it avoids disc jamming in the device due to that the disc is loaded in an oblique direction.

Since the disc is smoothly loaded into the device only in the case that the periphery B of the disc A should press against the both guiding parts 42 and 52 to disengage the both hooks from the teeth arrays simultaneously, it avoids disc jamming in the device not only resulting from incorrect direction loading but also from loading of non-circular disc.

Figure 6:
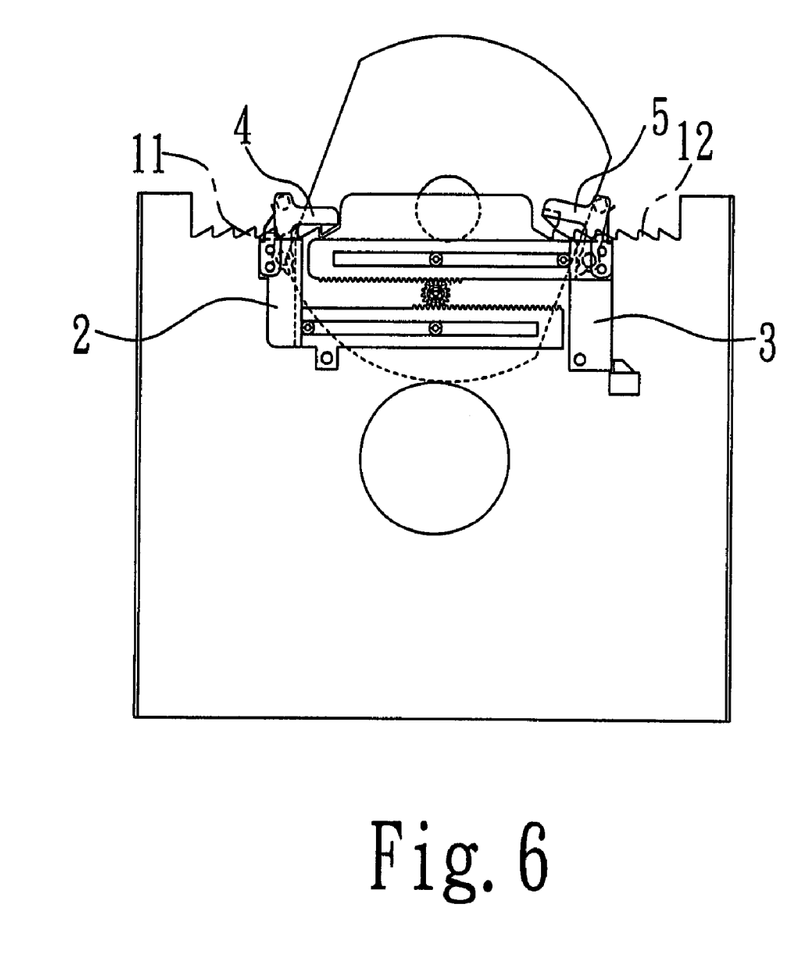
FIG. 6 is a perspective drawing showing another case that loading of disc having a non-circle shape.

FIG. 6 is a perspective drawing showing another case that loading of disc having a non-circular shape. As shown in FIG. 6, if the disc to be loaded is a non-circular disc, the periphery B of the disc A would not press against the guiding parts 42 and 52 simultaneously to disengage the both hooks from the teeth arrays so that the first and the second sliding bars 2 and 3 would not slide with respect to each other. Thus the disc could not be loaded into the device and would be stopped at the inlet. User can take off the disc in time to avoid disc jamming in the device.

Figure 7A:
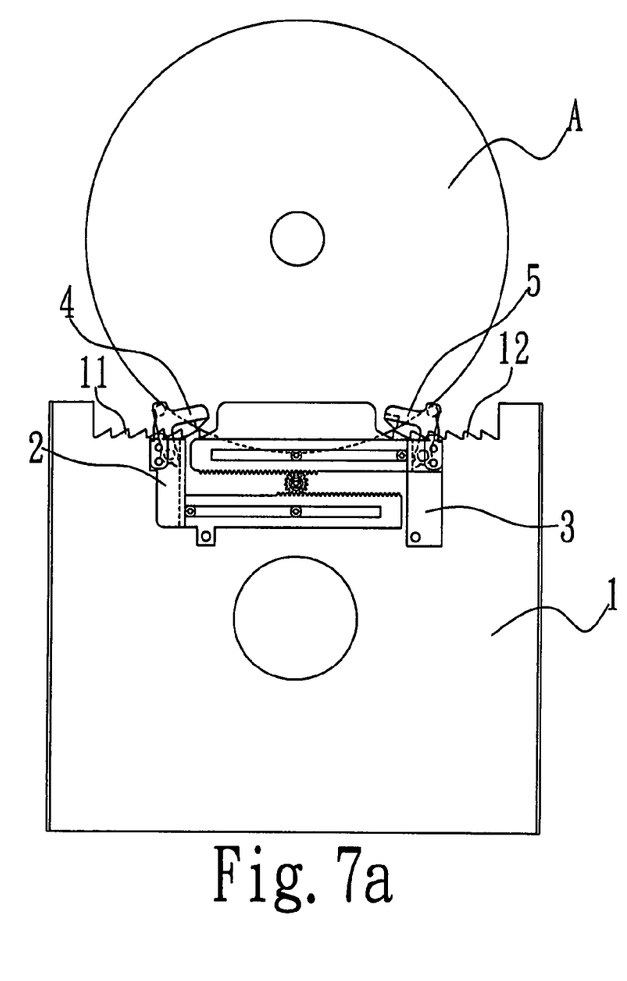
FIGS. 7a to 7b are drawings showing the continuous action during loading of a disc having a bigger radius.
Figure 7B:
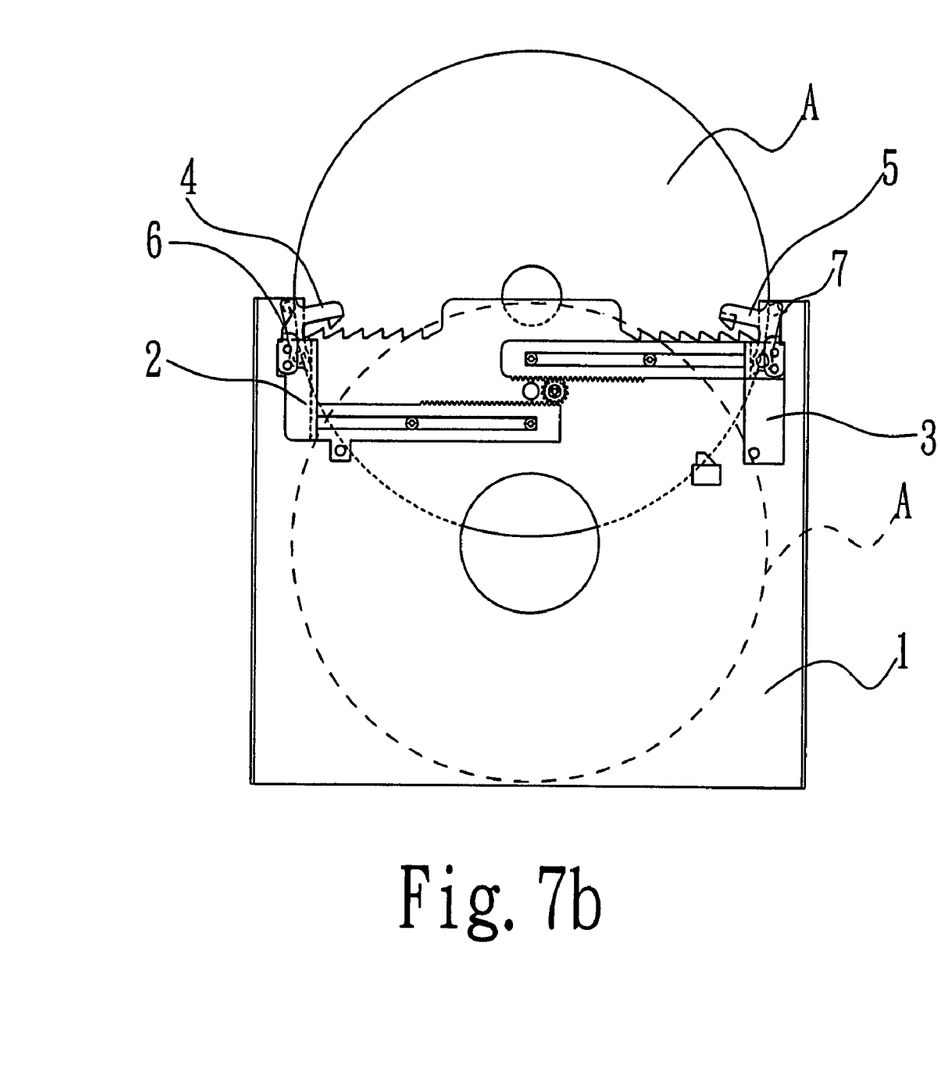

FIGS. 7a to 7b are drawings showing the continuous action during loading of a disc having a bigger radius. The action shown in FIG. 7 is similar to that shown in FIG. 4 except that the diameter of the disc to be loaded is larger than that shown in FIG. 4. From FIG. 7, it clearly shows that the disc guiding mechanism of the present invention is suitable for any circular disc having various diameters.

Figure 2:
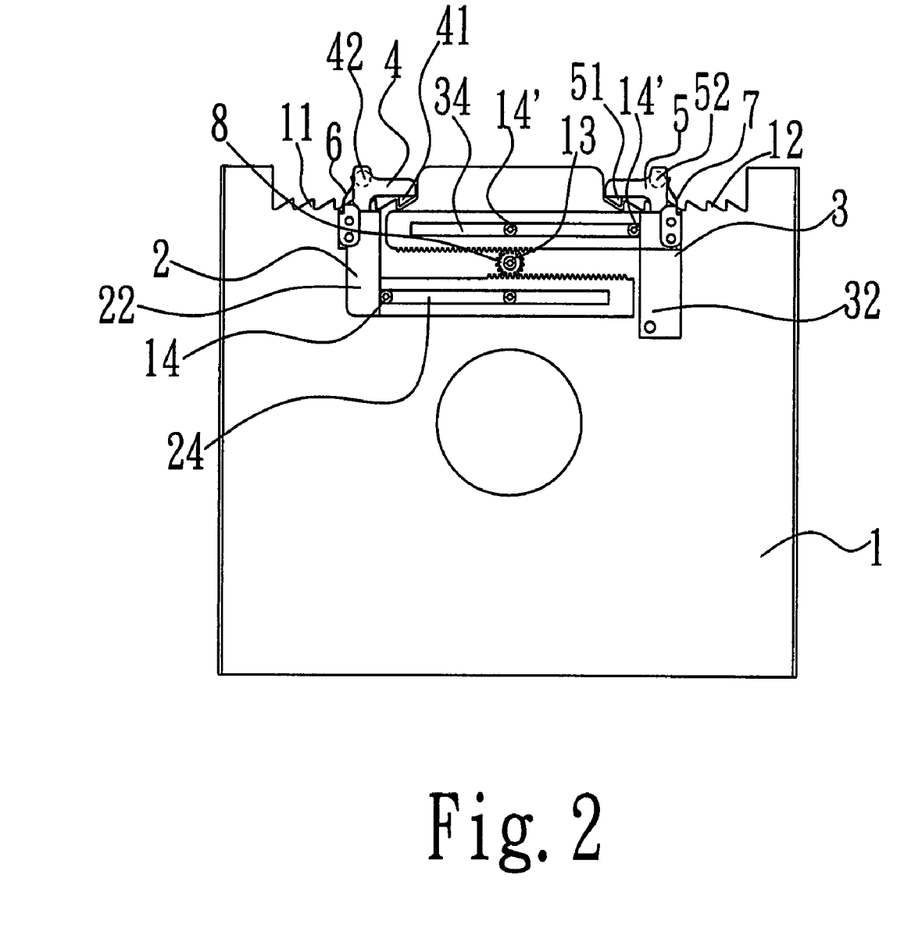
FIG. 2 is a perspective drawing showing one embodiment of the disc guiding mechanism of the present invention.
Figure 8:
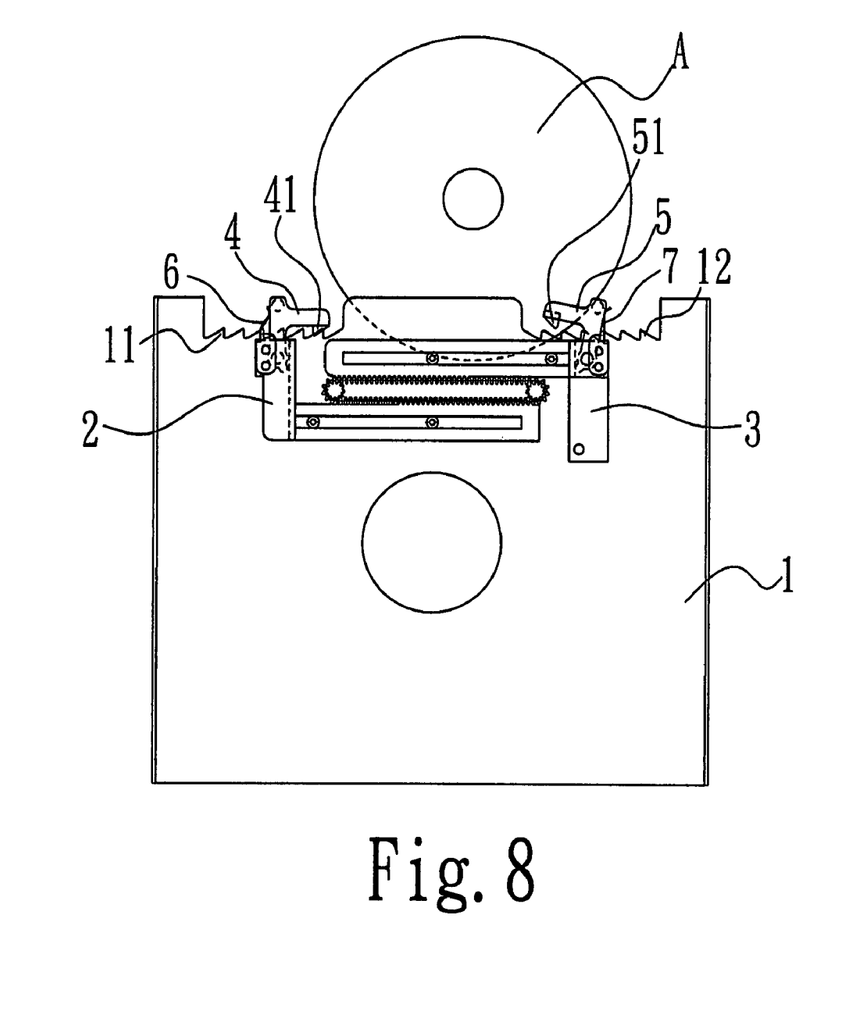
FIG. 8 is a perspective drawing showing another embodiment of the disc guiding mechanism of the present invention.

FIG. 8 is a perspective drawing showing another embodiment of the disc guiding mechanism of the present invention, which configuration is similar to that shown in FIG. 2 except that the transmission element 8 is an endless teeth track. In this embodiment, all elements and their functions are the same as those mentioned in the above FIG. 2.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A disc guiding mechanism provided at the inlet of an optical disc device, which comprises:
   a main body provided with a teeth array at a side where a disc is to be loaded;
   a first sliding bar and a second sliding bar both of which are movably provided on the main body;
   a transmission element provided on the main body and engaged with both of the sliding bars;
   a first hook and a second hook rotatably provided on each sliding bar respectively; and
   a first elastic member and a second elastic member provided on each sliding bar for providing an elasticity on the hooks to engage the hooks with the teeth array.

2. The disc guiding mechanism according to claim 1, wherein the first sliding bar is not slid when the first hook is engaged with the teeth array.

3. The disc guiding mechanism according to claim 2, wherein the second sliding bar is not slid attributed to the restriction of the transmission element between the first and the second sliding bars when the second hook is disengaged from the teeth array.

4. The disc guiding mechanism according to claim 1, wherein the hooks are each provided with hooking parts to be engaged with the teeth array.

5. The disc guiding mechanism according to claim 1, wherein the hooks are each provided with guiding parts to guide the disc into the device.

6. The disc guiding mechanism according to claim 5, wherein the hooks are disengaged from the teeth array and the sliding bars are sliding toward opposite directions respectively when the guiding parts are pressed by the disc to resist the elasticity of the elastic members.

7. The disc guiding mechanism according to claim 1, wherein the hook is further provided with a spinning center connecting with the sliding bar and the sliding bar is correspondingly provided with a pivot to provide the hook a fulcrum for spinning.

8. The disc guiding mechanism according to claim 1, wherein the transmission element is a gear and the sliding bars are correspondingly provided with a rack to be engaged therewith.

9. The disc guiding mechanism according to claim 1, wherein the sliding bars are further provided with a horizontal guiding member for sliding them on the main body horizontally.

10. The disc guiding mechanism according to claim 1, wherein the transmission element is an endless teeth track and the sliding bars are correspondingly provided with teeth to be engaged therewith.

11. The disc guiding mechanism according to claim 1, further comprises a spring member for pulling the sliding bars back to the original position after completing the loading.

12. The disc guiding mechanism according to claim 11, wherein the spring member is provided between the transmission element and the main body.

13. The disc guiding mechanism according to claim 12, wherein the spring member is a clockwork-like spring.

14. The disc guiding mechanism according to claim 11, wherein the spring member is provided between the both sliding bars.

* * * * *